United States Patent
Seifert et al.

(10) Patent No.: US 9,193,398 B2
(45) Date of Patent: Nov. 24, 2015

(54) METHODS AND APPARATUS FOR REDUCTION OF AERODYNAMIC DRAG

(71) Applicant: Ramot at Tel-Aviv University Ltd., Tel-Aviv (IL)

(72) Inventors: Avraham Seifert, Tel-Aviv (IL); Vitali Palei, Bat-Yam (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 14/143,049

(22) Filed: Dec. 30, 2013

(65) Prior Publication Data

US 2014/0110967 A1    Apr. 24, 2014

Related U.S. Application Data

(63) Continuation of application No. 12/598,441, filed as application No. PCT/IL2008/000542 on Apr. 27, 2008, now Pat. No. 8,616,615.

(60) Provisional application No. 60/924,158, filed on May 2, 2007, provisional application No. 60/924,157, filed on May 2, 2007.

(51) Int. Cl.
*B62D 35/00* (2006.01)
*F15D 1/12* (2006.01)

(52) U.S. Cl.
CPC *B62D 35/00* (2013.01); *F15D 1/12* (2013.01); *B64C 2230/18* (2013.01); *Y02T 50/166* (2013.01); *Y10T 137/0318* (2015.04); *Y10T 137/0391* (2015.04); *Y10T 137/206* (2015.04); *Y10T 137/2202* (2015.04); *Y10T 137/2234* (2015.04); *Y10T 137/2245* (2015.04)

(58) Field of Classification Search
CPC .... B62D 35/001; B62D 35/007; B62D 35/00; F15D 1/12
USPC ............................................. 296/180.1, 180.4
See application file for complete search history.

(56) References Cited

U.S. PATENT DOCUMENTS

| | | | |
|---|---|---|---|
| 3,016,066 | A | 1/1962 | Warren |
| 3,093,306 | A | 6/1963 | Warren |
| 3,098,504 | A | 7/1963 | Joesting |
| 3,124,999 | A | 3/1964 | Woodward |
| 3,158,166 | A | 11/1964 | Warren |
| 3,238,958 | A | 3/1966 | Warren et al. |

(Continued)

FOREIGN PATENT DOCUMENTS

| | | |
|---|---|---|
| EP | 1506911 | 2/2005 |
| EP | 1544089 | 6/2005 |

(Continued)

OTHER PUBLICATIONS

2nd Written Opinion Dated May 13, 2009 From the International Preliminary Examining Authority Re.: Application No. PCT/IL2008/000541.

(Continued)

*Primary Examiner* — Joseph D Pape (57) ABSTRACT

A method of reducing aerodynamic drag on a moving blunt-edged body, the method comprising actively generating a flow of air at a blunt edge of a body and using the generated flow of air to control an external flow of air moving relative to an edge of a moving blunt-body.

15 Claims, 9 Drawing Sheets

(56) References Cited

U.S. PATENT DOCUMENTS

| | | |
|---|---|---|
| 3,266,510 A | 8/1966 | Wadey |
| 3,357,441 A | 12/1967 | Adams |
| 3,371,675 A | 3/1968 | Hatch |
| 3,504,691 A | 4/1970 | Campagnuolo et al. |
| 3,529,612 A | 9/1970 | Rausch |
| 3,552,415 A | 1/1971 | Small |
| 3,580,265 A | 5/1971 | Horacek |
| 3,807,662 A | 4/1974 | Velazquez |
| 3,868,322 A | 2/1975 | Orloff |
| 3,901,277 A | 8/1975 | Viets |
| 3,942,559 A | 3/1976 | Kranz et al. |
| 4,231,519 A | 11/1980 | Bauer |
| 4,291,395 A | 9/1981 | Holmes |
| 5,129,585 A | 7/1992 | Bauer |
| 5,374,013 A | 12/1994 | Bassett et al. |
| 5,524,660 A | 6/1996 | Dugan |
| 5,863,090 A | 1/1999 | Englar |
| 5,893,383 A | 4/1999 | Facteau |
| 2006/0048829 A1 | 3/2006 | Seifert et al. |
| 2010/0194142 A1 | 8/2010 | Seifert et al. |

FOREIGN PATENT DOCUMENTS

| | | |
|---|---|---|
| FR | 916198 | 11/1946 |
| FR | 2890637 | 3/2007 |
| GB | 1235222 | 6/1971 |
| WO | WO 90/05084 | 5/1990 |
| WO | WO 2006/080873 | 8/2006 |
| WO | WO 2008/135967 | 11/2008 |
| WO | WO 2008/135968 | 11/2008 |

OTHER PUBLICATIONS

International Search Report Dated Sep. 4, 2008 From the International Search Report Re.: Application No. PCT/IL2008/000541.

International Search Report Dated Sep. 4, 2008 From the International Searching Authority Re.: Application No. PCT/IL2008/000542.

Official Action Dated May 3, 2011 From the US Patent and Trademark Office Re. U.S. Appl. No. 12/598,441.

Official Action Dated Dec. 11, 2012 From the US Patent and Trademark Office Re. U.S. Appl. No. 12/598,441.

Official Action Dated Jan. 12, 2012 From the US Patent and Trademark Office Re. U.S. Appl. No. 12/598,441.

Official Action Dated Jul. 12, 2013 From the US Patent and Trademark Office Re. U.S. Appl. No. 12/598,441.

Official Action Dated Jan. 18, 2011 From the US Patent and Trademark Office Re. U.S. Appl. No. 12/598,441.

Official Action Dated Feb. 19, 2013 From the US Patent and Trademark Office Re. U.S. Appl. No. 12/598,444.

Official Action Dated Jun. 26, 2012 From the US Patent and Trademark Office Re. U.S. Appl. No. 12/598,441.

Official Action Dated Oct. 29, 2012 From the US Patent and Trademark Office Re. U.S. Appl. No. 12/598,444.

METHODS AND APPARATUS FOR REDUCTION OF AERODYNAMIC DRAG

RELATED APPLICATIONS

This application is a continuation of U.S. patent application Ser. No. 12/598,441 filed on Apr. 5, 2010, which is a National Phase of PCT Patent Application No. PCT/IL2008/000542 having International filing date of Apr. 27, 2008, which claims the benefit of priority of U.S. Provisional Patent Application Nos. 60/924,157 and 60/924,158, both filed on May 2, 2007, and is also related to an application entitled "Apparatus and Method for Oscillating Fluid Jets" filed as PCT Patent Application No. PCT/IL2008/00541 having International filing date of Apr. 27, 2008, subsequently filed as U.S. National Phase patent application Ser. No. 12/598,444 on Apr. 14, 2010. The disclosures of all of the above mentioned applications are fully incorporated herein by reference.

FIELD OF THE INVENTION

The present invention relates to apparatus and methods for reducing aerodynamic drag, for example on blunt-(or bluff) bodies including, but not limited to, a trucks aft-body and other vehicles.

BACKGROUND OF THE INVENTION

As a vehicle moves forward, external air flow along surfaces of the vehicle separates from the surfaces at the aft end of the vehicle. Separation is most pronounced in vehicles with a substantially vertical aft face (e.g. trucks). The separation of flow from surface creates an area of low pressure behind the aft face of the vehicle. The area of low pressure "drags" the vehicle backward in a phenomenon known as aerodynamic drag. Aerodynamic drag on vehicles (e.g. trucks) significantly reduces fuel efficiency.

Reduced fuel efficiency leads to increased fuel consumption which contributes to air pollution and/or production of greenhouse gases and/or increased transportation cost.

Mechanical (static) flow deflectors mounted on vehicles in various configurations are employed to control external flow layer flow in an attempt to increase fuel efficiency. These mechanical flow deflectors are commonly referred to as "flarings" or "deflectors".

Aerodynamic drag accounts for approximately 50%-70% of total motion resistance on a moving ground vehicle (e.g. truck) at highway speeds. Therefore, a 20% reduction in aerodynamic drag has the potential to a net reduction of total drag by 10%. The 10% drag reduction has the potential to reduce fuel consumption by 7-10%. Actual reductions in fuel consumption from a 20% reduction in aerodynamic drag are influenced by other factors, including, but not limited to, vehicle weight and energetic cost of implementing the reduction. At current fuel prices, a truck traveling 50,000 miles/year at highway speeds could realize a net savings of $3000 per annum from a 20% reduction in aerodynamic drag. Trucks traveling greater distances can realize a proportionately greater savings. Alternatively, or additionally, the 7-10% reduction in fuel consumption could have significant environmental impact. Existing passive deflectors do not have the capacity to reduce aerodynamic drag and/or fuel consumption to this degree. Additional development of passive deflectors to increase a degree to which they contribute to fuel efficiency is considered impractical because of limitations imposed by size and/or weight and/or cost and/or operational considerations. Operational considerations include, but are not limited to, effects of loading and unloading goods, obstructing visibility of lights and reflectors, and significant overhang of devices.

Means of producing super-circulation via application of high speed wall-jets to curved aerodynamic shapes using the Coanda effect have been extensively studied. (See for example: Jones, G S and Englar, R J, AIAA paper 2003-3411, the contents of which are fully incorporated herein by reference.) More recently similar concepts have been applied to reduce the drag of heavy vehicles. (See for example: SAE Technical paper 2001-01-2072 by R. J. Englar and AIAA paper 2004-2249 by R. C. McCallen et al., the contents of which are fully incorporated herein by reference.)

U.S. Pat. No. 4,736,913 to Bennett et al. describes a fluid flow control device which controllably maintains attached flow in the region of a body having a contour of rapid curvature utilizing tangential fluid discharge slots, positioned just upstream from the separation line, which issue a thin jet sheet to energize the external flow layer and entrain the surrounding flow. Bennett describes application to the aft fuselage of an aircraft to reduce separation and vortex drag at cruise and provide control forces and moments during low speed operation of the aircraft. The disclosure of this patent is fully incorporated herein by reference.

U.S. Pat. No. 7,104,498 to Englar et al. describes an aircraft comprising a channel wing having blown channel circulation control wings (CCW) for various functions. The described CCW relies upon a source of pressurized air and is capable of tangentially discharging pressurized air over the rounded trailing edge. The pressurized air being discharged over the rounded trailing edge provides a high lift that is obtained independent of an aircraft angle of attack, thus preventing the asymmetry, separated flow, and stall experienced by the CC wing at the high angle of attack it required for high lift generation. The aircraft can further include blown outboard circulation control wings (CCW) that are synergistically connected to the blown channel CCWs. The blown outboard CCWs provide additional high lift, control thrust/drag interchange, and can provide all three aerodynamic moments when differential blowing is applied front-to-rear or left-to-right. Both the blown channel CCW. The disclosure of this patent is fully incorporated herein by reference.

U.S. Pat. No. 7,055,541 to Seifert et al. entitled "Method and Mechanism for Producing Suction and Periodic Excitation Flow", the disclosure of which is fully incorporated herein by reference, describes exemplary valves suitable for use in some embodiments of the invention disclosed herein.

In earlier studies to characterize the effect of external flow control on wing sections, it has been determined that oscillating or pulsed streams of air applied to or near the surface for the purpose of controlling separation can be as much as one hundred times more effective than similar flows applied without oscillation or pulsing. (Seifert et al. (1996) J. of Aircraft 33 (4): 691-699).

SUMMARY OF THE INVENTION

According to an aspect of some embodiments of the present invention there is provided an apparatus adapted to reduce aerodynamic drag on a vehicle moving through a fluid, the apparatus including:(a) an apparatus housing including: a first outer surface adapted to extend outward with a downward inclination from an upper edge of the vehicle while the housing is mounted on a trailing surface of the vehicle: and a second outer surface adapted to extend outward at substantially right angles from the trailing surface of the vehicle from a location below the upper edge; and (b) a flow generator within the housing the flow venerator adapted to generate at least one flow which controls an external flow at an edge of the vehicle on which the apparatus housing is mounted. An aspect of some embodiments of the invention relates to actively controlling an external flow at an edge of a moving blunt object as a means of reducing drag. In an exemplary embodiment of the invention, the moving blunt object is a portion of a vehicle (e.g. truck aft-body) or an item carried on a vehicle (e.g. shipping container).

In an exemplary embodiment of the invention, active control includes application of a fluid jet and/or suction to an existing external flow. Optionally, the fluid jet is a pulsed and/or oscillating fluid jet. Optionally, the edge at which external flow layer control occurs can include one or more of an upper edge, a lower edge and a lateral edge.

In an exemplary embodiment of the invention, an active external flow control apparatus reduces aerodynamic drag on the object with a blunt aft-region when the object is in transit. Optionally, the apparatus is applied in a. retrofitting operation or during manufacture. Retrofit apparatus can be external or internal (built in). In an exemplary embodiment of the invention, incorporating an active external flow control apparatus into the blunt object reduces aerodynamic drag on the object when the object is in transit. Optionally, incorporation occurs during or after manufacture of the blunt object.

Optionally, objects with blunt aft regions include, but are not limited to, trucks, truck trailers, vans, sport utility vehicles (SUVs), buses, station wagons and shipping containers.

In an exemplary embodiment, an apparatus and/or method according to the invention prevent external flow separation many times more efficiently that previously available deflectors or flarings. Optionally, pulsing and/or oscillation of applied flows significantly increases their effectiveness.

In an exemplary embodiment, an apparatus and/or method according to the invention are deployed and/or practiced in conjunction with previously available deflectors or flarings to achieve a synergistic delay in external flow separation. Optionally, an apparatus according to an exemplary embodiment of the invention serves as a deflector in a passive mode.

According to various exemplary embodiments of the invention, the active external flow control apparatus can be characterized by straight and/or curved surfaces. Optionally, the curved surfaces are convex, concave or a combination thereof.

An aspect of some embodiments of the invention relates applying an input energy to external flow at an edge of a moving blunt object as a means of reducing drag. In an exemplary embodiment of the invention, the input energy contributes to a disruption in external flow which contributes to the drag reduction. Optionally, the input energy comes from an existing system of a motor vehicle and/or is provided by an energy supply installed expressly to provide the input energy.

In an exemplary embodiment of the invention, there is provided a method of reducing aerodynamic drag on a moving blunt-edged body, the method comprising:

(a) actively generating a flow of air at a trailing blunt edge of a body; and (b) using the generated flow of air to control an external flow of air moving relative to an edge of a moving blunt-body.

Optionally, the blunt edge is characterized by a small radius compared to another dimension of the body (e.g., its height, a ratio of 5-20 smaller).

Optionally, using the generated flow of air to control the external flow comprises applying a generated flow at an angle to an existing external flow to create a modified external flow.

Optionally, using the generated flow to control the external flow comprises applying a flow through a conduit comprising one or more suction ports to create a suction flow, the suction flow through the one or more suction ports modifying external flow.

Optionally, generating and using comprise applying a flow through a conduit comprising one or more suction ports to create a suction flow, the suction flow through the one or more suction ports modifying external flow and applying a jet flow at an angle to an existing external flow to create a modified external flow.

Optionally, the generated flow is a pulsed jet flow.

Optionally, the method is applied to at least a portion of a ground vehicle.

Optionally, the method is applied to at least a portion of a shipping container.

Optionally, the method comprises adding an apparatus to the blunt body, the apparatus altering a contour of the blunt body in at least one dimension.

Optionally, the method comprises adding an apparatus to the blunt body, the apparatus not altering a contour of the blunt body.

Optionally, generating comprises providing input energy to air to actively generate the flow.

Optionally, providing the input energy comprises drawing energy from an existing system of a motorized vehicle.

Optionally, drawing energy comprises drawing electrical energy from a power source of the motorized vehicle.

Optionally, drawing energy comprises drawing mechanical energy from an existing system of the motorized vehicle.

Optionally, drawing energy comprises capturing at least a portion of heat energy created by internal combustion engine of the motorized vehicle Optionally, drawing energy comprises diverting at least a portion of an air flow created by a temperature control system of the motorized vehicle.

Optionally, drawing energy comprises diverting at least a portion of an air flow created by a pneumatic system of the motorized vehicle.

Optionally, providing the input energy comprises using energy source which operates independently of any existing systems of a motorized vehicle.

Optionally, the actively generated flow is characterized by a flow rate of at least 0.5 L/S.

Optionally, the actively generated flow is characterized by a pressure of at least 4 PSI at the inlet for the flow control device.

In an exemplary embodiment of the invention, there is provided an apparatus adapted to reduce aerodynamic drag on a body moving through a fluid, the apparatus comprising:

(a) an apparatus housing; and (b) a flow generator within the housing, the flow generator adapted to generate at least one flow type which controls an external flow at an edge of a moving body on which the apparatus housing is mounted.

Optionally, the at least one flow generated by the flow generator comprises a pulsed flow which exits the apparatus housing at an angle to an existing external flow to create a modified external flow.

Optionally, the at least one flow generated by the flow generator comprises a suction flow applied to an existing external flow by at least one suction port to create a modified external flow.

Optionally, the at least one flow generated by the flow generator comprises a suction flow applied to an existing external flow by at least one suction port to create a modified external flow and also comprises a jet flow which exits the apparatus housing at an angle to an existing external flow to create a modified external flow.

Optionally, the jet flow is a pulsed jet flow.

Optionally, the apparatus is mounted on an exterior surface of a ground vehicle.

Optionally, the apparatus is mounted within a wall of a ground vehicle.

Optionally, the apparatus is mounted on an exterior surface of an item being transported by a ground vehicle (e.g. a shipping container).

Optionally, the apparatus is mounted within a wall of an item being transported by a ground vehicle (e.g. a shipping container).

Optionally, the apparatus comprises an energy source adapted to divert energy from an existing system of a motorized vehicle to generate said flow.

Optionally, the existing system of the motorized vehicle is selected from the group consisting of an electrical system, a drive train and a temperature control system.

Optionally, the flow generator is adapted to generate a flow characterized by a rate of at least 0.5 L/S through at least one flow port.

Optionally, the flow generator is adapted to generate a flow characterized by a pressure of at least 3 PSI through at least one flow port.

In an exemplary embodiment of the invention, there is provided a method of reducing aerodynamic drag on a ground vehicle, the method comprising:

(a) mounting an apparatus adapted to actively control an external flow on the ground vehicle; and (b) operating the apparatus while the vehicle is in motion.

Optionally, the motion is above a threshold velocity.

Optionally, mounting an apparatus on the vehicle occurs during manufacture of the vehicle.

Optionally, mounting an apparatus on the vehicle occurs after manufacture of the vehicle (retrofit).

Optionally mounting an apparatus on the ground vehicle occurs comprises placing the apparatus on an outer surface of the vehicle.

Optionally, the operating occurs at least at a speed in excess of approximately 70 kilometers per hour.

BRIEF DESCRIPTION OF THE DRAWINGS

Exemplary non-limiting embodiments of the invention described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DESCRIPTION OF EXEMPLARY EMBODIMENTS

Overview

Figure 1A:
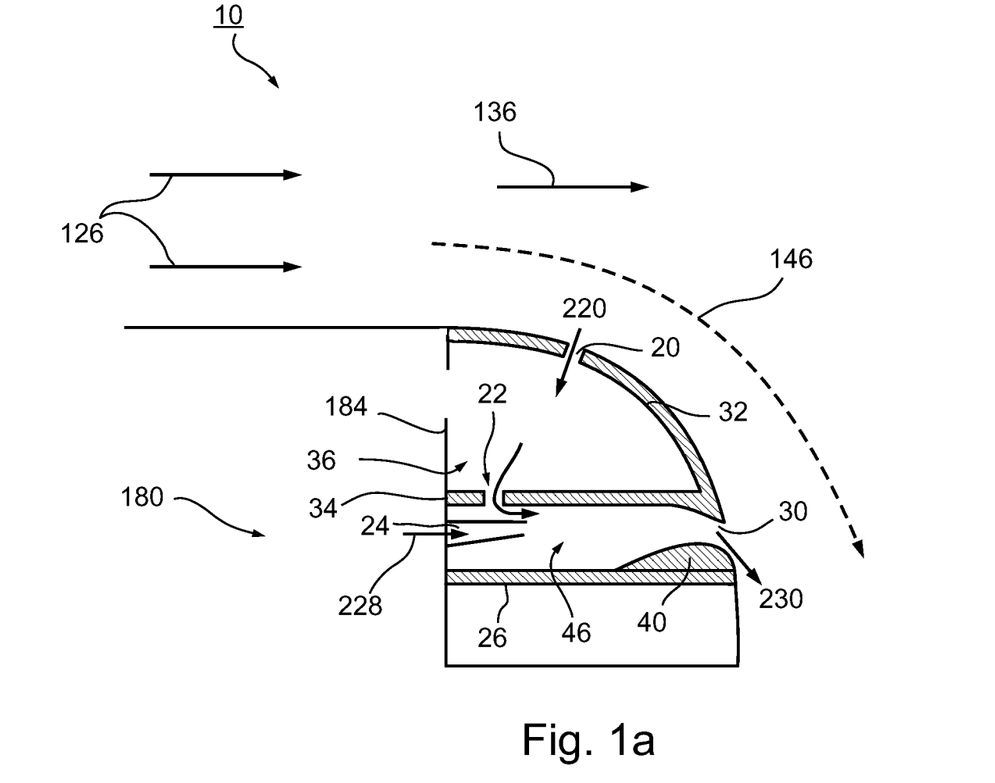
FIG. 1A is a schematic representation in a lateral cross sectional view, of an apparatus according to an exemplary embodiment of the invention.

FIG. 1A is a schematic representation, in a lateral cross sectional view, of an apparatus 10 according to an exemplary embodiment of the invention. Apparatus 10 is depicted attached to a trailing edge 184 of a blunt body 180. As blunt body 180 moves forward (left in this view) an external flow 126 is established. Nominally, flow 126 continues (136) behind trailing edge 184. In an exemplary embodiment of the invention, apparatus 10 causes a deflected external flow 146. In the depicted embodiment, deflected flow 146 is shifted downwards with respect to nominal flow 136.

In the depicted embodiment, apparatus 10 comprises a housing 32 containing an upper chamber 36 and a conduit 46 separated by a dividing wall 34. In an exemplary embodiment of the invention, dividing wall 34 includes one or more ports 22 between upper chamber 36 and conduit 46. In an exemplary embodiment of the invention, a lower wall 26 defines a bottom edge of conduit 46.

According to exemplary embodiments of the invention, an input flow 228 enters conduit 46 via an input port 24. In an exemplary embodiment of the invention, input flow 228 is driven by an input energy. Optionally, at least one suction port 20 provides fluid communication between an external environment and upper chamber 32. In the depicted embodiment, as input flow 228 flows through conduit 46, additional fluid is drawn from upper chamber 36 into conduit 46 via port 22, due to reduced pressure behind the exit of input port 24. Drawing of additional fluid from upper chamber 36 through port 22 reduces pressure in upper chamber 36. The reduced pressure contributes to a suction flow 220 from the outside environment via suction port 20 into upper chamber 36. Optionally, suction flow 220 continues through port 22 into conduit 46 where it augments flow 228 by mixing therewith.

In an exemplary embodiment of the invention, at least one output flow port 30 allows a flow in conduit 46 to exit to the outside environment. Optionally, one or more protrusions 40 are installed in conduit 46 near output flow port 30 to direct output flow 230 in a desired direction. In an exemplary embodiment of the invention, the desired direction is angle downwards with respect to nominal external flow 136. In an exemplary embodiment of the invention, suction flow 220 and/or output flow 230 contribute to a deflection of nominal flow 136 to create deflected flow 146.

Figure 1B:
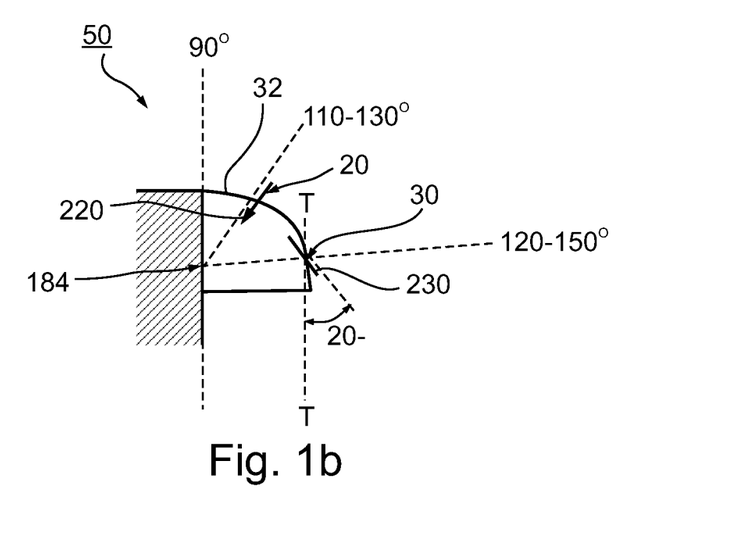
FIG. 1B illustrates exemplary ranges of flow angles which contribute to an operational efficiency of different exemplary embodiments of the invention.

FIG. 1B is a diagram 50 illustrating exemplary ranges of flow angles which contribute to an operational efficiency of different exemplary embodiments of the invention. The diagram is superimposed on an outline of a cross section of an apparatus as in FIG. 1A. In diagram 50, trailing face 184 is indicated as 90 degrees (vertical). Optionally, suction port 20 is positioned at 110 to 130° and output flow port 30 is positioned at 120 to 150°. In addition, the figure indicates that in some exemplary embodiments of the invention, output flow port 30 is angled 20-40° with respect to a line tangent (indicated as T-T) to housing 32 at a site of port 30.

Figure 1C:
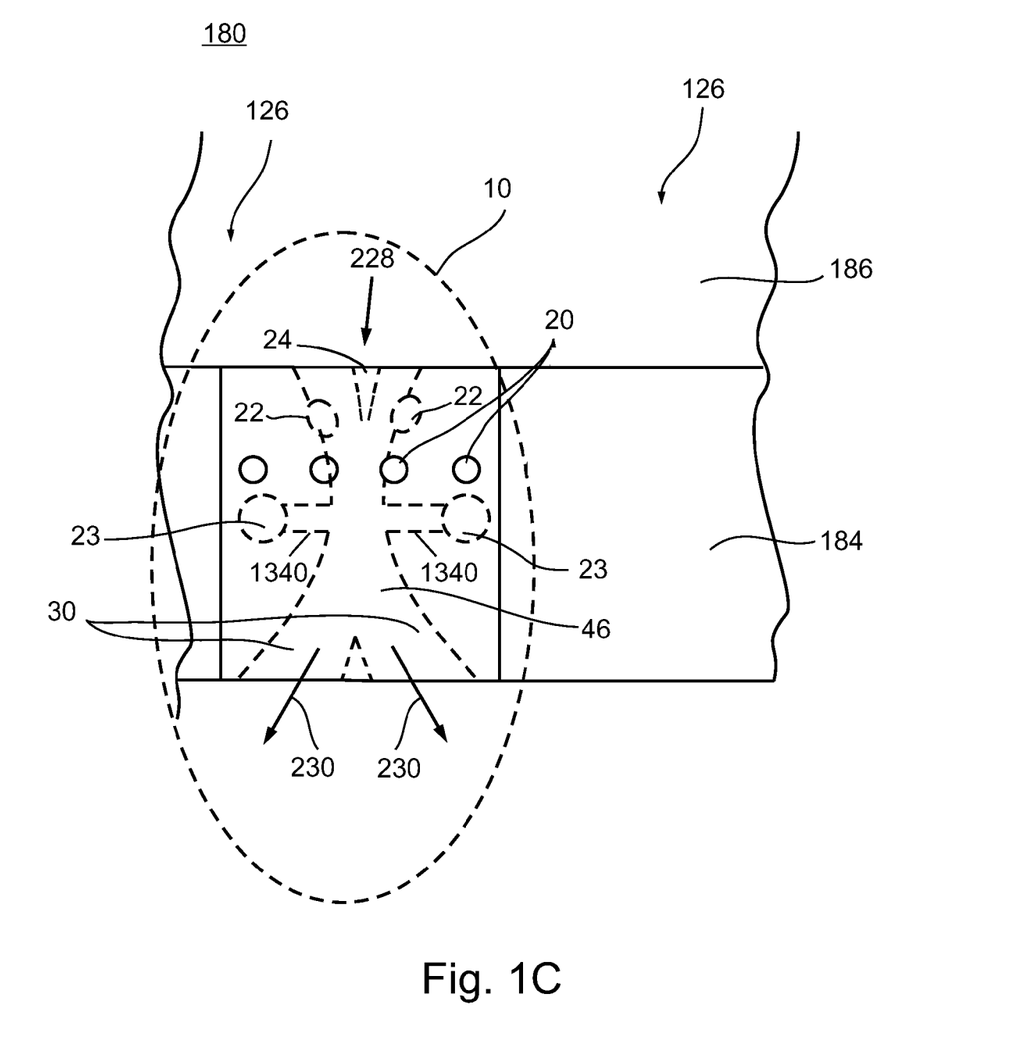
FIG. 1C is a plan-view of an apparatus according to an exemplary embodiment of the invention.

FIG. 1C depicts blunt body 180 unfolded so that upper surface 186 (also shown in FIG. 2) and trailing surface 184 lie in a single plane. In this view apparatus 10 is visible on an upper portion of trailing surface 184 near upper surface 186. According to exemplary embodiments of the invention, an input flow 228 enters conduit 46 via an input port 24. In order to induce oscillation, oscillation control ports 1340 are provided transverse to a wall of conduit 46. In the depicted embodiment, two exit ports 30 are depicted. Optionally, exit flow 230 oscillates between these ports. Optionally, oscillation is controlled by a feedback tube (connecting between ports 23, tube not shown in 180 for clarity) of the type described in a co-pending U.S. patent application Ser. No. 12/598,444 referenced above in the related applications section. In particular FIG. 1 of that application shows the connection between ports 23 in the present application.

Figure 1D:
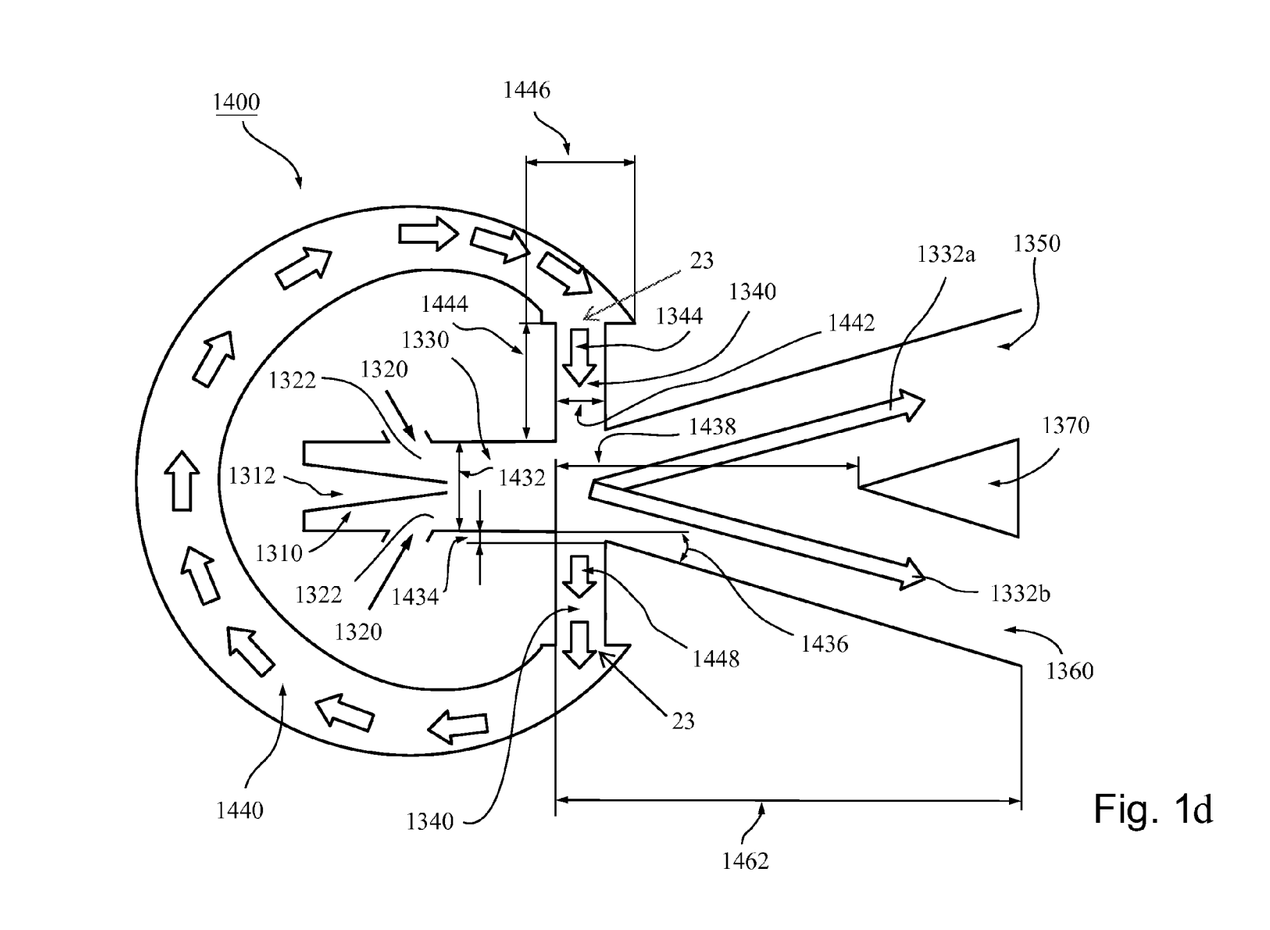
FIG. 1D is a schematic representation of an exemplary oscillating flow apparatus 1400 according to one embodiment of the invention.

FIG. 1D is a schematic representation of an exemplary oscillating flow apparatus 1400 according to one embodiment of the invention in lateral cross section.

In order to induce oscillation, oscillation control ports 1340 are provided transverse to a wall of conduit 1330. In an exemplary embodiment of the invention, oscillation control ports 1340 are connected to one another by a feedback tube 1440 adapted to control oscillation.

In the depicted embodiment, an initial flow 1312 enters an inner lumen of conduit 1330 via a primary injection port 1310. Optionally, port 1310 includes a regulation mechanism adapted to vary a rate of initial flow 1312. In an exemplary embodiment of the invention, varying initial flow 1312 contributes to a change in an oscillation frequency. In the depicted exemplary embodiment, area 1432 of conduit 1330 is adapted to mix flows 1322 and 1332.

Optionally, initial flow 1312 is supplemented by one or more suction flows 1322 recruited via one or more suction ports 1320 (two suction ports 1320 are depicted, but any number is possible as long as symmetry is preserved). Optionally, ports 1320 include a regulation mechanism adapted to vary a rate of suction flows 1322. In an exemplary embodiment of the invention, varying suction flows 1322 contributes to a change in an oscillation frequency. Suction ports 1320 can optionally be configured as slots.

In an exemplary embodiment of the invention, initial flow 1312 results from an energy input into the system. Optionally, suction flows 1322 are passively drawn into conduit 1330 by flow 1312 exiting injection port 1310 according to Bernoulli's principle and entrainment process due to mixing between energetic flow 1312 and entrained flows 1322. Suction flows 1322 mix with initial flow 1312 to produce an amplified flow 1332 (a or b). In an exemplary embodiment of the invention, amplified flow 1332 is characterized by a flow rate representing a sum of flow rates of initial flow 1312 and all suction flows 1322. Optionally, suction flows 1322 bring additional fluid into the system (e.g. from a boundary layer flowing past suction ports 1320). In an exemplary embodiment of the invention, conduit 1330 is sufficiently long to insure thorough mixing of initial flow 1312 and suction flow(s) 1322 before amplified flow 1332 reaches oscillation control ports 1340.

In the depicted embodiment, amplified flow 1332a proceeds through conduit 1330 and is deflected by a splitter 1370 towards exit direction 1350. As amplified flow 1332a passes oscillation control ports 1340, flow 1332a is closer to upper oscillation port 1340 as in proceeds towards exit direction 1350, as opposed to exit direction 1360. In the depicted embodiment, exit directions 1350 and 1360 are separated by a splitter 1370.

Proximity of amplified flow 1332a to upper oscillation port 1340 causes a negative pressure 1344 in upper oscillation control port 1340, due to flow 1332 turning around the corner. The transmitted negative pressure 1344 causes a series of cyclic oscillations of amplified flow 1332 between exit directions 1350 and 1360 as described below with reference to FIG. 1.

As described above negative pressure 1344 in upper control port 1340 results from passage and turning of flow 1332a across upper port 1340 and into exit port 1350.

As depicted in FIG. 1D, the negative pressure 1344 creates a negative traveling pressure pulse (traveling opposite the arrows in oscillation feedback tube 1440) which produces a positive flow 1448 in lower oscillation control port 1340.

In an exemplary embodiment of the invention, the transmitted negative pressure pulse (or alternatively the positive flow) 1448 deflects primary flow 1332a from exit direction 1350 to exit direction 1360 where it is depicted as primary flow 1332b.

At this point, pressures in flow control ports 1340 and the pressure sign in feedback control tube 1440 are inverted.

In an exemplary embodiment of the invention, primary flow 1332 oscillates between an "a" state in which it flows towards exit direction 1350 and a "b" state in which it flows towards exit direction 1360. Optionally, an oscillation frequency (f) can vary with one or more of an offset distance 1434 between a distal end of conduit 1330 and a proximal end of an angled exit port (e.g. 1350 or 1360), a wall angle 1436 of the angled exit port, a splitter distance 1438 (between a distal end of conduit 1330 and a proximal end of the splitter 1370), a diameter 1442 of oscillation port 1340, a height 1444 of oscillation port 1340, a hydraulic diameter 1446 of oscillation feedback tube 1440 and a length 1462 of an exit port (i.e. linear distance from distal end of conduit 1330 to egress from exit port (e.g. 1360) without regard to angle). In an exemplary embodiment of the invention, as the wall angle 1436 increases, a control pressure 1344 and/or 1448 at which oscillation begins also increases.

In an exemplary embodiment of the invention, a large number of suction ports 20 converge via upper chamber 36 (see FIG. 1A) to a smaller number of connecting ports 22. Optionally, upper chamber 36 serves to guide suction flow 220 back to ports 22 which are behind an outlet of inlet port 24. Although a large number of suction ports 20 are depicted, a similar effect can be achieved by providing a single confluent opening spanning a similar width of rear face 184, in the shape of a single hole or elongated slot or multiple thereof.

Figure 2:
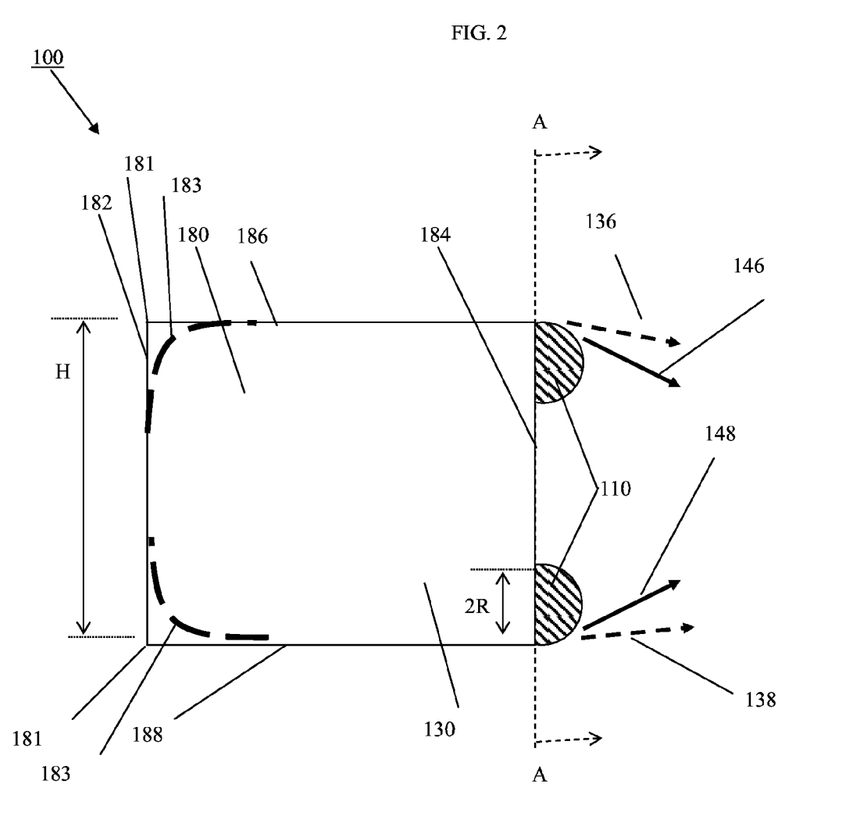
FIG. 2 is a schematic representation in a lateral cross section view of an apparatus according to an exemplary embodiment of the invention mounted on a blunt-body.

FIG. 2 is a schematic representation 100, in a lateral cross sectional view, of apparatus 110 according to an exemplary embodiment of the invention installed on a blunt-body 180. In an exemplary embodiment of the invention, blunt body 180 is a truck aft-body or a shipping container on a truck bed, semi-trailer or trailer. In the depicted embodiment, apparatus 110 are installed on upper and lower edges of trailing face 184. Alternatively, or additionally, apparatus 110 can be installed on lateral (vertical) edges of trailing face 184.

Air flows around blunt body 180 as it travels forward (left in this view) with leading face 182 (seen as an edge in this view) disrupting the airflow so that an external flow is created above upper surface 186 of blunt body 180, along the sides of body 180, and below lower surface 188 of blunt body 180. Typically, all external flows separate and continue to flow parallel beyond trailing face 184 of blunt body 180 at the height of upper surface 186 and lower surface 188, respectively and from the sides of body 180.

In the exemplary embodiment of FIG. 2, each apparatus 110 is depicted a having a 180 degree circular arc in cross section. Optionally, arc angles of 90 degrees or less are sufficient in terms of flow control functionality and are used to merely attach apparatus 110 to trailing face 184.

In an exemplary embodiment of the invention, angle 250 (FIG. 3A) is 90 degrees or more. Optionally, larger angles do not reduce aerodynamic efficiency but can impose other operational constraints, such as blocking doors used for loading and unloading.

Physical presence of an exemplary apparatus 110 according to an embodiment of the invention can cause some passive redirection of the external flow layer airflow in a downward direction as indicated by 136. An additional exemplary apparatus 110 installed adjacent to lower edge 188 can cause a similar passive redirection of the external airflow in an upward direction as indicated by 138. This effect can be attributed to the function of apparatus 110 as a passive deflector. The same principle holds for device similar to 110 attached to the sides of the blunt surface 184.

Wind tunnel experiments demonstrate that flow 228 delivered with a pressure of 6 psi produces a resulting oscillation frequency between output ports 30 of 90 Hz. Optionally, the oscillation frequency has a relatively weak effect on downward deflection 146. In an exemplary embodiment of the invention, increasing the pressure at which inlet flow 228 is delivered, increasing suction flow 220, frequency and magnitude of pulsed blowing flow 230, and consequently contributes to an increase in an angle of downward deflection 146. In an exemplary embodiment of the invention, as angle of downward deflection 146 increases, drag reduction also increases. In an exemplary embodiment of the invention, there is a trade-off between angle of downward deflection 146, the pressure at which inlet flow 228 is delivered and a net drag reduction.

In an exemplary embodiment of the invention, redirected external flow 146 contributes to a reduction in aerodynamic drag which is 1.5, 2, 3, 4, or 5 times, or intermediate or greater numbers of times, greater than that provided by passive deflection. Optionally, the degree to which redirected external flow 146 contributes to a reduction in aerodynamic drag varies with an angle of the redirection. In an exemplary embodiment of the invention, the angle of redirection varies with rates of flows 220 and/or 230 and/or with angles at which they are applied.

Various ways of actively redirecting external flows are described in greater detail hereinbelow in the context of different exemplary embodiments of the invention.

Optionally, junctions 181 between leading edge 182 and upper and lower surfaces (186 and 188 respectively) are curved as indicated by dashed lines 183. Curving (e.g. of the type indicated by 183) is well known to eliminate flow separation at the leading faces of blunt bodies. However, in typical vehicles and/or shipping containers characterized by a length which is 2, optionally 3 or more, times greater than a height and/or width, this curving at leading edge 182 has a relatively small effect on external flow layer separation at the trailing edge 184 of blunt body 180. Thus, modification of leading edge 182 does not significantly reduce aerodynamic drag at trailing edge 184.

In the lateral cross section of FIG. 2, devices 110 are visible only at upper and lower edges of trailing face 184 although they can be installed in additional and/or other positions according to various exemplary embodiments of the invention.

According to various exemplary embodiments of the invention apparatus 110 can be deployed along as much as 100% or as little as 10% of a circumference of trailing face 184 of blunt body 180. In an exemplary embodiment of the invention, apparatus 110 is deployed along 25%, 50% or 75% of a circumference of trailing face 184.

In an exemplary embodiment of the invention, apparatus 110 is mounted on a top and/or bottom edge of trailing face 184 of blunt body 180. Optionally, this configuration deflects external flow upwards and/or downwards towards a horizontal midline of trailing face 184 of blunt body 180.

In an exemplary embodiment of the invention, apparatus 110 is mounted on one or more vertical side edges of trailing face 184 of blunt body 180. Optionally, this configuration deflects external flow inwards towards a vertical midline of trailing face 184 of blunt body 180.

In an exemplary embodiment of the invention, a plurality of output flow ports 30 are distributed along one or more edges of aft face 184. In an exemplary embodiment of the invention, a ground vehicle can be fitted with one or more apparatus 110 which provide, tens, optionally hundreds, of ports 30 along a single edge of aft face 184. Optionally, there is a tradeoff between a number of output ports 30 and a velocity of flow 230 from each port 30 to produce a desired deflection of external flow. Optionally, production of the desired deflection contributes to a desired net drag reduction.

In an exemplary embodiment of the invention, each port 30 provides a flow of 0.5 to 1.0 L/S or more. Optionally, the flow is a pulsed flow. Optionally, the pulsed flow oscillates between two or more ports 30. In an exemplary embodiment of the invention, Tens to hundreds of ports 30 provide a total airflow of 1 to 200 L/s. Optionally, the flow is delivered at a pressure of 1-10 PSI above atmospheric pressure, optionally 4-6 PSI above atmospheric pressure.

Exemplary Apparatus Configuration

Figure 3A:
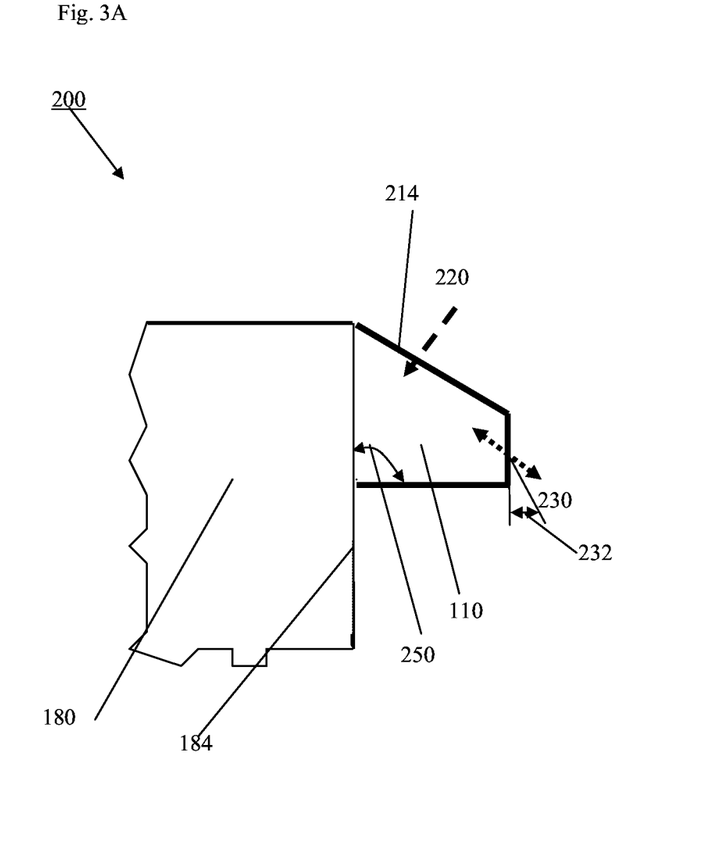
FIGS. 3A, 3B and 3C are schematic representations in a lateral cross sectional view of a portion of an apparatus mounted on a blunt-body illustrating suction direction (dashed arrow) and pulsed fluid ejection and/or additional suction (dotted arrow according to an exemplary embodiment of the invention.

FIG. 3A is a schematic representation 200 in a lateral cross sectional view of a portion of an apparatus 110 with a housing 214 characterized by one or more straight edges according to an exemplary embodiment of the invention mounted on trailing face 184 of blunt body 180 illustrating a suction direction (dashed arrow 220) and pulsed fluid ejection and/or additional suction (dotted arrow 230) of flows generated by apparatus 110.

In an exemplary embodiment of the invention, one or more pulsed flows 230 are applied at a downward angle (one pulsed flow 230 is pictured for clarity). Optionally, flow 230 can include a jet emanating outwards from housing 214 of apparatus 110 and/or a suction flow directed inwards to housing 214 of apparatus 110. Flow 230 should be ejected at a shallow angle 232 with respect to a curved surface of apparatus 110. Optionally, the shallow angle is 15, 25, 35 or 45 degrees (or smaller or intermediate or greater number of degrees) relative to a tangent to surface 214 at the injection location.

Alternatively, or additionally, apparatus 110 creates a suction flow 220 into an upper portion of housing 214 as a means of deflecting the external flow downwards (one suction flow 220 is pictured for clarity). Optionally, suction is supplied by one or more suction ports in a conduit used to provide pulsed flow 230.

In an exemplary embodiment of the invention, a magnitude of suction flow 220 and/or pulsed flow 230 are of an order of magnitude of a relative translation speed of body 180 with respect to fluid or vise versa. In an exemplary embodiment of the invention, blunt body 180 flows 220 and/or 230 are applied when blunt body 10 travels at highway speed (e.g. 50 to 80 MPH or more). Optionally, a velocity of flow 220 and/or 230 is 10, 20, 30, 40, 50, 60, 70, 80 or 90 MPH or intermediate or greater velocities. In an exemplary embodiment of the invention, a velocity of flow 220 and/or 230 is adjusted according to a velocity of a vehicle upon which apparatus 110 is mounted. Optionally, a velocity of flow 220 and/or 230 is 50% to 200% of a velocity of the vehicle. In an exemplary embodiment of the invention, a velocity of flow 220 and/or 230 is roughly equivalent to a velocity of the vehicle. Generally, an amount of drag reduction increases as a velocity of flows 220 and/or 230 increases.

In an exemplary embodiment of the invention, apparatus 110 is characterized by an aspect ratio (R:H; indicated in FIG. 2) of 1:4, 1:8, 1:10, 1:12, 1:16, 1:18, 1:20, 1:25 or lesser or intermediate or greater aspect ratios where 2R is a vertical height of apparatus 110 with respect to trailing face 184 and H is a vertical height of body 180. In an exemplary embodiment of the invention, increasing the aspect ratio contributes to an increase in requirement for flow to achieve a similar control magnitude. Optionally, an aspect ratio between 1:5 and 1:20 provides an acceptable tradeoff between required flow control magnitude and achieved drag reduction.

Figure 3B:
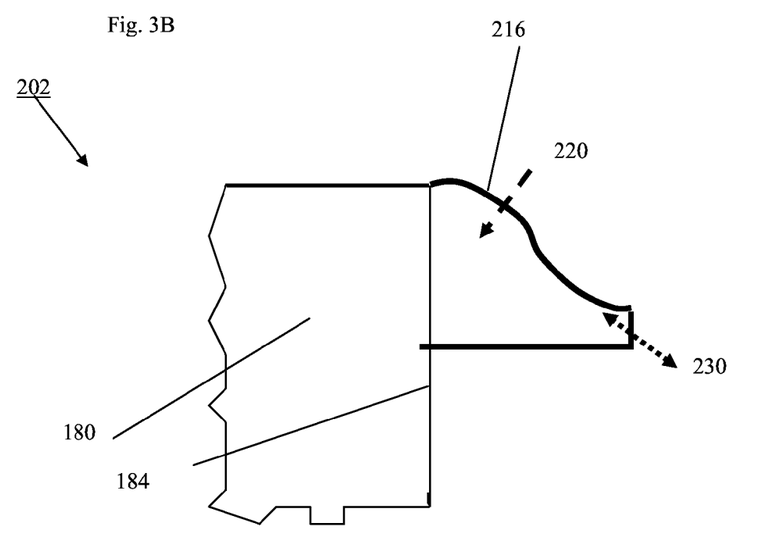

FIG. 3B depicts an additional exemplary embodiment 202 in which apparatus housing 216 is characterized by an upper surface which is partially convex and partially concave.

In an exemplary embodiment of the invention, exit ports 30 (represented here by pulsed flow 230) so that that the pulsed flow 230 impacts the external flow layer at a place where it tends to re-separate downstream of the suction ports 20 (represented by suction flow 220), contributes to an increase in efficiency.

Figure 3C:
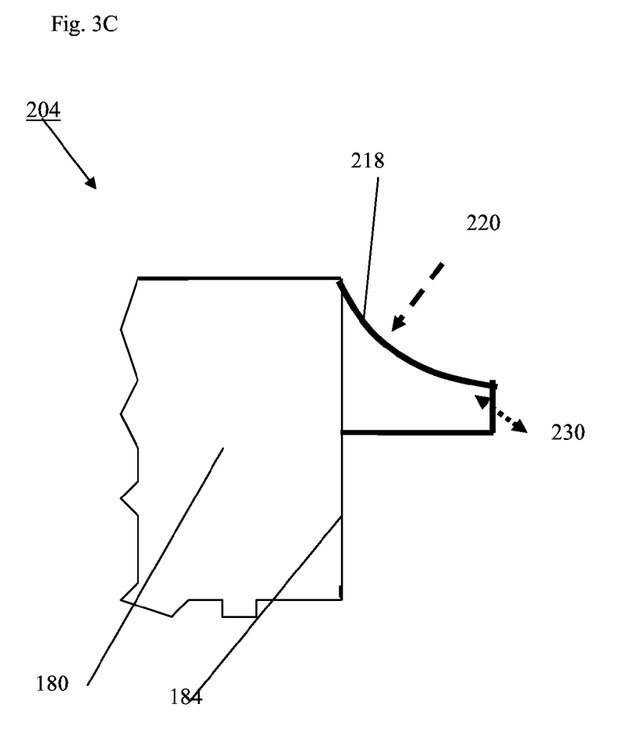

FIG. 3C depicts an additional exemplary embodiment 204 in which apparatus housing 218 is characterized by an upper surface which is substantially concave.

Exemplary Mounting Configuration

Figure 4A:
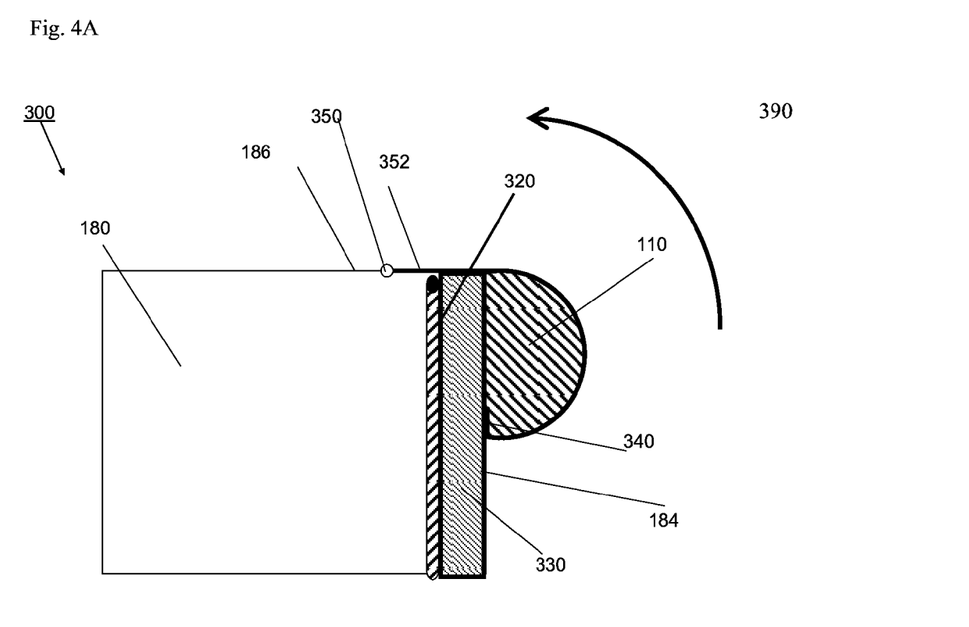
FIGS. 4A and 4B are schematic representations of a in a lateral cross sectional view mounted on a blunt-body according to different exemplary embodiments of the invention.

FIG. 4A is a schematic representation of a mounting configuration 300 for apparatus 110 on blunt body 180 according to an exemplary embodiment of the invention in a lateral cross sectional view. In the depicted embodiment, trailing face 184 comprises a door 330 mounted on a hinge 320. Optionally, apparatus 110 is connected to upper surface 186 of blunt body 180 by apparatus hinge 350 and/or connector 352. In an exemplary embodiment of the invention, apparatus 110 is moved or rotated 390 to permit opening of door 330. Optionally, apparatus 110 moves rotationally with respect to apparatus hinge 350 and/or axially with respect to connector 352. According to various embodiments of the invention, apparatus 110 occupies as little as 10% or as much as 100% a width and/or circumference of rear face 184.

In an exemplary embodiment of the invention, connector 352 is provided without hinge 350 and apparatus 110 is temporarily removed by detaching connector 352 to facilitate opening of door 330.

In an exemplary embodiment of the invention, apparatus 110 is permanently attached to a rear facing surface of door 330. Optionally, apparatus 110 is divided into two sections which correspond to two doors 330. In an exemplary embodiment of the invention, input flow 228 is provided separately to each apparatus 110. In an exemplary embodiment of the invention, a single input flow 228 is distributed to both halves of apparatus 110 via a distribution pipe.

In an exemplary embodiment of the invention, external flow along upper surface 186 of blunt body 180 and connector 352 contributes to a tendency of apparatus 110 to remain in place.

In an exemplary embodiment of the invention, an additional attachment mechanism 340 is provided between door 330 and apparatus 110. Optionally, attachment mechanism 340 is a releasable mechanism, for example a magnet, a piece of hooks and eyes cloth or a cotter pin.

Figure 4B:
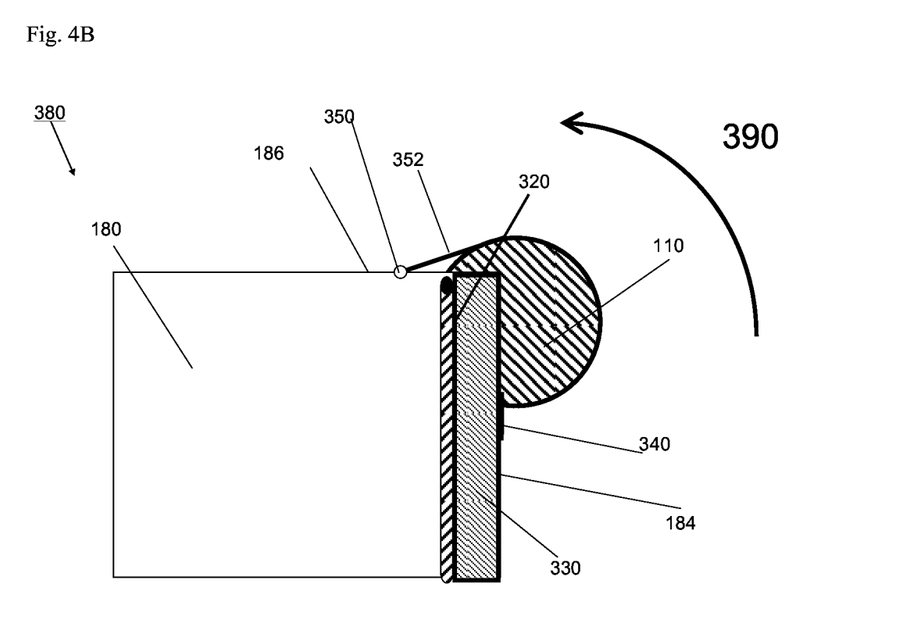

FIG. 4B depicts an exemplary embodiment of the invention 380 in which apparatus 110 is vertically off-set with respect to blunt body 180. Optionally, vertical off-set of apparatus 110 physically disrupts external flow developing on upper surface 186 of body 180. Optionally, the vertical off-set is as little as 0.05 or much as 1.0 times a radius of apparatus 110. Optionally, connector 352 is angled with respect to upper surface 186 (as depicted in FIG. 4B) or remains flat on upper surface 186 (as depicted in FIG. 4A).

In an exemplary embodiment of the invention, angling of connector 352 in combination with vertical off-set of apparatus 110 thins a thick turbulent external flow layer before it arrives at apparatus 110. Optionally, control is applied to the thinned external flow layer.

In FIGS. 4A and 4B, details of airflows within apparatus 110 are not visible. Referring concurrently to FIGS. 4A, 4B and 1A, a flexible hose or manifold can be provided to direct input flow 228 to inlet port 24. Optionally, the hose or conduit can be routed along an inner or outer surface of blunt body 180. Optionally, the hose or manifold can enter apparatus 110 from the bottom or side.

Exemplary Method

Figure 5:
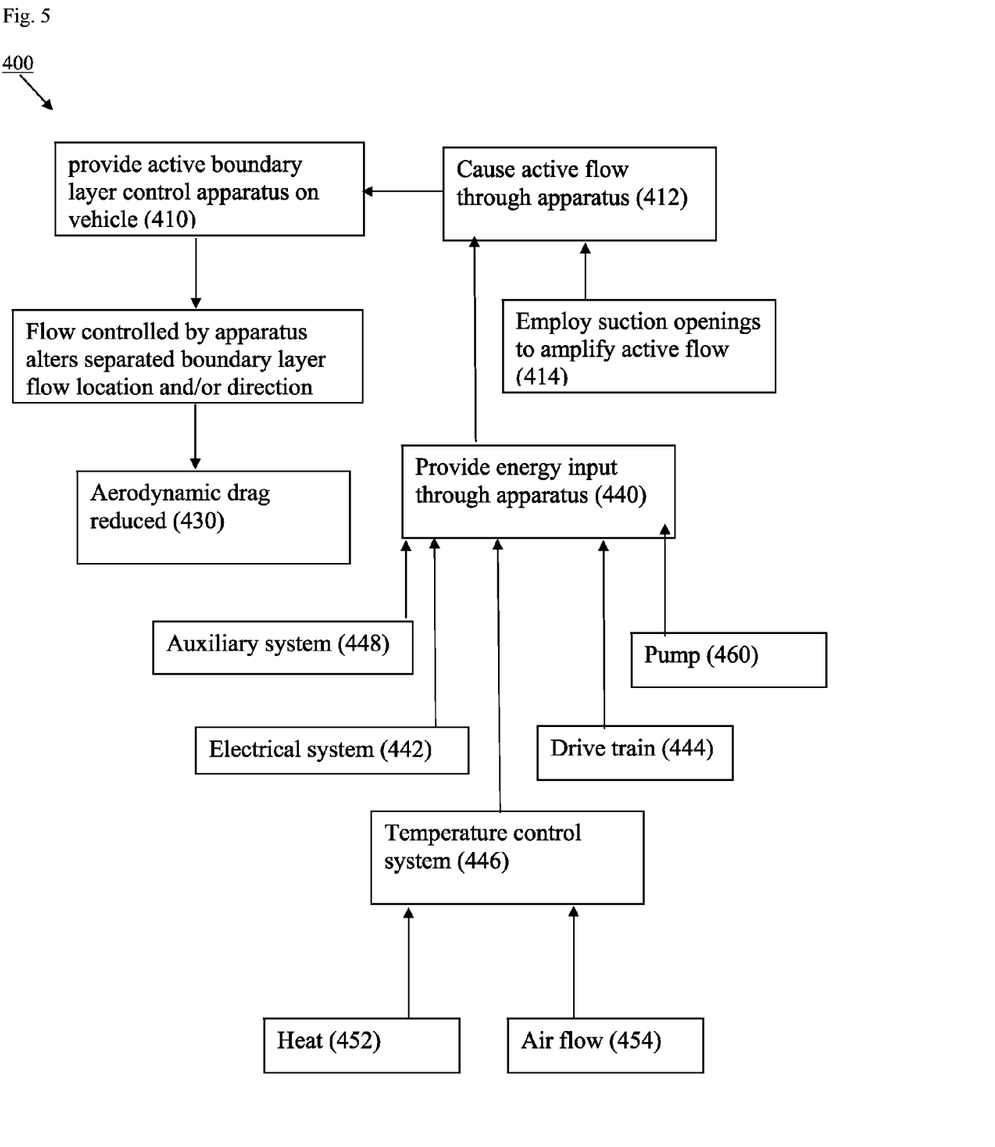
FIG. 5 is a simplified flow diagram of a method according to an exemplary embodiment of the invention.

FIG. 5 is a simplified flow diagram of an exemplary method 400 according to an embodiment of the invention.

At 410 an active external flow control apparatus is provided on a vehicle. Flow controlled 420 by the apparatus alters an external flow direction. In an exemplary embodiment of the invention, this alteration of an external flow direction contributes to a reduction 430 in aerodynamic drag and/or an increase in fuel efficiency.

In the depicted embodiment, providing 410 the active external flow layer control apparatus comprises causing 412 an active flow by the apparatus. Optionally, the active flow is directed to one or more desired exit directions. In an exemplary embodiment of the invention, multiple exits from the apparatus are aimed at different spanwise or streamwise angles to more effectively influence external flow separation. Optionally, the flow 230 oscillates between two or more exits so that flow from any single exit is pulsed. In an exemplary embodiment of the invention, exit ports for flow 230 are spaced 0.1R to 2R from one another spanwise. In an exemplary embodiment of the invention, the active flow is amplified 414 using suction openings. These openings can be either upstream, downstream or between (in the spanwise direction) the pulsed blowing slots/holes. In an exemplary embodiment of the invention, phase distribution in the spanwise direction is non-uniform. Optionally, non-uniform phase distribution in the spanwise direction contributes to an efficiency of pulsed blowing 230 in controlling external flow layer separation.

In an exemplary embodiment of the invention, an energy input is provided 440 through the apparatus as a means of causing 412 the active flow. According to various exemplary embodiments of the invention, the energy input can come from an existing electrical system 442 (e.g. by drawing current from a power source such as a battery), drive train 444 (e.g. by harnessing mechanical energy) or temperature control system 446 (e.g. in the form of heat 452 or airflow 454).

In an exemplary embodiment of the invention, provision 440 of energy input uses an amount of energy equivalent to 1 to 4% or lesser or intermediate or greater percentages of an output of a power plant of the vehicle. As an illustrative example, a 250 HP truck can use a power source which provides 2.5 to 10 HP to create flows 230 and/or 220 in apparatus 110. Optionally, provision 440 relies upon a pump 460. In an exemplary embodiment of the invention, pump 460 is driven by a dedicated motor which is separate from the vehicle motor.

Optionally, there is a tradeoff between a cost of the amount of energy provided 440 and drag reduction. In an exemplary embodiment of the invention, as more energy is provided, drag is reduced further. However, the next increment of drag reduction may not always be economically justifiable. In an exemplary embodiment of the invention, a 10% to 15% reduction in total drag is achieved resulting in a significant net cost savings results.

Exemplary Flow Generators

Flow generators suitable for producing flows described hereinabove are described in, for example, U.S. Pat. No. 7,055,541 to Seifert et al. entitled "Method and Mechanism for Producing Suction and Periodic Excitation Flow" and in a co-pending United States patent application entitled "Apparatus and Method for Oscillating Fluid Jets" identified as attorney docket number 33977 and filed the same day as the instant application by Arwatz et al. In particular zero-mass-flux apparatus and/or oscillating-flow apparatus are believed to be suitable for use in the context of exemplary embodiments of the invention.

One of ordinary skill in the art will be capable of incorporating these, or other, flow generating apparatus into various exemplary embodiments of the invention without undue experimentation.

Exemplary Energy Sources

In an exemplary embodiment of the invention, pressurized fluid (e.g. air) flows through the apparatus from an external source. In an exemplary embodiment of the invention, the external source draws energy from an existing system of a motor vehicle. According to various embodiments of the invention, energy to produce a pressurized fluid flow can come from, for example, one or more of the electrical system 442, the drive train 444 or the temperature control system 446.

In an exemplary embodiment of the invention, energy from electrical system 442 can be drawn from a main power source of the vehicle, or from an auxiliary power source provided to power the pressurized fluid flow. Optionally, an auxiliary battery is connected to the alternator in parallel to a main battery and serves as a power source.

In an exemplary embodiment of the invention, energy from drive train 444 can be harvested using gears rotating in the transmission assembly, using rotating parts between the transmission and the axle or using the wheels. Optionally, energy is harvested through friction or by introducing a subsidiary drive train with additional gears. Optionally, pressurized flow can be drawn from a turbo-charger which increases pressure of air inhaled into the engine using engine exhaust gases. One of ordinary skill in the art of engineering will be able to design a suitable interface between a selected energy source and an available airflow generator.

In an exemplary embodiment of the invention, energy from temperature control system 446 is harvested as heat 452. Optionally, a countercurrent heat exchanger is provided in a vehicle radiator for this purpose. In an exemplary embodiment of the invention, the heat is used to power a turbine to generate a desired fluid flow.

In an exemplary embodiment of the invention, energy from temperature control system 446 is harvested as air flow 454. Optionally, airflow is diverted from a vehicle pneumatic system to provide a desired fluid flow. In an exemplary embodiment of the invention, airflow is provided from a compressed air reservoir already available for braking and other uses.

In other exemplary embodiments of the invention, an auxiliary system 448 is installed in a vehicle to generate a desired fluid flow. Optionally, the auxiliary system includes, a "dynamo"-like pump. Optionally, the dynamo-like pump draws mechanical energy from one or more moving systems in the vehicle.

Optionally, the auxiliary system 448 is positioned below the truck-trailer (blunt body 180 in the figures), for example above the rear wheels.

Optionally, the auxiliary system 448 is positioned inside the truck-trailer (blunt body 180 in the figures), for example on a ceiling adjacent to door 330 or between a truck cab and a trailer.

Optionally, the auxiliary system 448 is positioned within apparatus 110. In an exemplary embodiment of the invention, positioning of auxiliary system 448 within, or in proximity to, apparatus 110 reduces an effect of friction losses in the tubing on the fluid flow being generated. In an exemplary embodiment of the invention, the reduction in friction contributes to an efficiency of auxiliary system 448.

In an exemplary embodiment of the invention, control of fluid flow through apparatus 110 is controlled, for example via a feedback loop. Optionally, fluid flow through apparatus 110 is responsive to vehicle speed and/or fluid dynamic pressure resulting from the vehicle speed relative to the blunt-body static pressure on aft face 184. In an exemplary embodiment of the invention, apparatus 110 is controlled by circuitry linked to a speedometer of the vehicle.

In an exemplary embodiment of the invention, input flow 228 is provided by a pump 460. In an exemplary embodiment of the invention, pump 460 is driven by a dedicated motor which is separate from the vehicle motor.

In an exemplary embodiment of the invention, apparatus 110 is at least partially powered, optionally fully powered, by the stagnation pressure resulting from the translation speed.

Exemplary Apparatus Configuration

In an exemplary embodiment of the invention, apparatus 110 lateral cross-section can take the shape of a curved surface, such as a segment of a circular cylinder or any elliptic-like cylinder or convex, concave or convex-concave cylinder that is connected to the aft-region of blunt body 180.

In an exemplary embodiment of the invention, suction (e.g. 220 in FIG. 1a) is applied from slots or holes at $\alpha$=100 to 130 deg on the cylinder (where 90 deg is trailing face 184 of blunt body 180) in order to delay external flow layer separation upstream of trailing face 184.

Further downstream (i.e., at $\alpha$>120-130 degrees), the external flow layer would tend to separate again and there, in an exemplary embodiment of the invention, pulsed blowing 230 is applied to prevent or delay this additional external flow layer separation.

Optionally, combination of suction 220 and pulsed-blowing 230 provides a degree of separation delay not previously achieved. In an exemplary embodiment of the invention, a selected degree of separation delay is greater at a given control authority than using previously available alternatives. Optionally, this contributes to an overall system net power saving. Alternatively, or additionally, combination of suction 220 and pulsed-blowing 230 from a retrofit apparatus 110 has not been used previously employed or described in a ground vehicle. Optionally combination of suction 220 and pulsed-blowing 230 from a retrofit apparatus 110 has not been used previously employed or described in any fluid related system.

Exemplary Built-in Configuration

In an exemplary embodiment of the invention, an active external flow control device is permanently mounted on, or in, a rear door 330 of blunt body 180. Optionally, permanent mounting permits opening of door 330 without disengaging or moving the device in a separate action.

While "retrofit" attachment of apparatus 110 is shown and described above (most clearly in FIGS. 4A and 4B), it is envisioned that built-in apparatus will become available as manufacturers (e.g. of vehicles and/or parts for vehicles) realize the practical and/or economic advantages of aerodynamic drag reduction offered by various exemplary embodiments of the invention.

Optionally, the apparatus can be installed in a wall, roof or floor of blunt body 180 near trailing surface 184. For purposes of this application and the accompanying claims, the term "wall" includes a door. In an exemplary embodiment of the invention, an apparatus installed within the wall is provided with higher flow rates of suction 220 and/or jet flow 230. Optionally, the higher flow rates compensate for a loss of passive deflector effect.

Optionally, external flow layer separation control at leading face 182 is implemented when it is infeasible to implement curvature 183.

Optionally, external flow layer separation control at upper surface 186 is implemented near a junction with leading face 182.

A variety of numerical indicators have been utilized to describe various components of apparatus 110 and/or relationships between the apparatus and blunt body 180 (e.g. truck body). It should be understood that these numerical indicators could vary even further based upon a variety of engineering principles, materials, intended use and designs incorporated into the invention. Additionally, components and/or actions ascribed to exemplary embodiments of the invention and depicted as a single unit may be divided into subunits. Conversely, components and/or actions ascribed to exemplary embodiments of the invention and depicted as sub-units may be combined into a single unit with the described/depicted function.

Alternatively, or additionally, apparatus 110 according to various embodiments of the invention are depicted mounted on a trailing edge 184 of blunt-body 180 although, in some exemplary embodiments of the invention apparatus 110 can be mounted on a leading edge 182 and/or on an upper surface 186 and/or on a lower surface 188 of blunt body 180. Optionally, positioning of apparatus 110 on a leading edge of a vehicle is desirable as a substitute for, or in conjunction with, aerodynamic shaping of the leading edge. In an exemplary embodiment of the invention, positioning of apparatus 110 on a leading edge of a vehicle serves as a substitute for aerodynamic shaping when such shaping is not possible/desired due to functional considerations, such as loss of internal volume, cost or for existing systems.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce exemplary embodiments of the invention. The examples given above are exemplary in nature and are not intended to limit the scope of the invention which is defined solely by the following claims. Specifically, the invention has been described in the context of a trailing face 184 of blunt-body 180 but might also be advantageously applied at other positions on the vehicle.

The terms "include", "comprise" and "have" and their conjugates as used herein mean "including but not necessarily limited to".

The term "fluid" as used herein includes air as well as other gases and/or liquids (e.g. water).

The term "blunt edged" as used herein also refers to small radius edged bodies. The scope of the invention is limited only by the following claims.

What is claimed is:

1. An apparatus adapted to reduce aerodynamic drag on a vehicle moving through a fluid, the apparatus comprising:
    (a) an apparatus housing including:
        a first outer surface adapted to extend outward with a downward inclination from an upper edge of the vehicle while the housing is mounted on a trailing surface of the vehicle; and
        a second outer surface adapted to extend outward at substantially right angles from the trailing surface of the vehicle from a location below the upper edge; and
    (b) a flow generator within the housing, the flow generator adapted to generate at least one flow which controls an external flow at an edge of the vehicle on which the apparatus housing is mounted.

2. Apparatus according to claim 1, wherein the at least one flow generated by the flow generator comprises a pulsed flow which exits the apparatus housing at an angle to an external flow to create a modified external flow.

3. Apparatus according to claim 1, wherein the at least one flow generated by the flow generator comprises a suction flow applied to an external flow by at least one suction port to create a modified external flow.

4. Apparatus according to claim 1, wherein the at least one flow generated by the flow generator comprises a suction flow applied to an external flow by at least one suction port to create a modified external flow and also comprises a jet flow which exits the apparatus housing at an angle to an external flow to create a modified external flow.

5. Apparatus according to claim 4, wherein the jet flow is a pulsed jet flow.

6. Apparatus according to claim 1, wherein the first surface is an inclined flat surface.

7. Apparatus according to claim 1, wherein the first surface is a concave surface.

8. Apparatus according to claim 1, wherein the first surface is at least partially convex.

9. Apparatus according to claim 1, wherein the first surface is partially convex and partially concave.

10. Apparatus according to claim 3, wherein the at least one suction port penetrates through the first surface.

11. Apparatus according to claim 1 including a pair of output flow ports through which at least one jet flow of air is expelled.

12. Apparatus according to claim 11, wherein each output flow port of the pair direct the at least one flow of air in a direction generally away from the edge and at an angle to the trailing surface and wherein the at least one flow of air oscillates between the pair of output flow ports, wherein a change in direction of the flow due to the oscillating between the pair of output flow ports is in a direction parallel to the edge.

13. Apparatus according to claim 1, wherein that apparatus is sized to extend over 5-20% of a vertical height of the trailing surface.

14. Apparatus according to claim 1, wherein the flow generator is adapted to generate a flow characterized by a rate of at least 0.5 L/S through at least one flow port.

15. Apparatus according to claim 1, wherein the flow generator is adapted to generate a flow characterized by a pressure of at least 1 PSI through at least one flow port.

* * * * *